Sept. 2, 1930.  W. J. ALBERTY  1,774,583
MECHANISM FOR APPLYING BRAKES
Filed Dec. 20, 1926   2 Sheets-Sheet 1
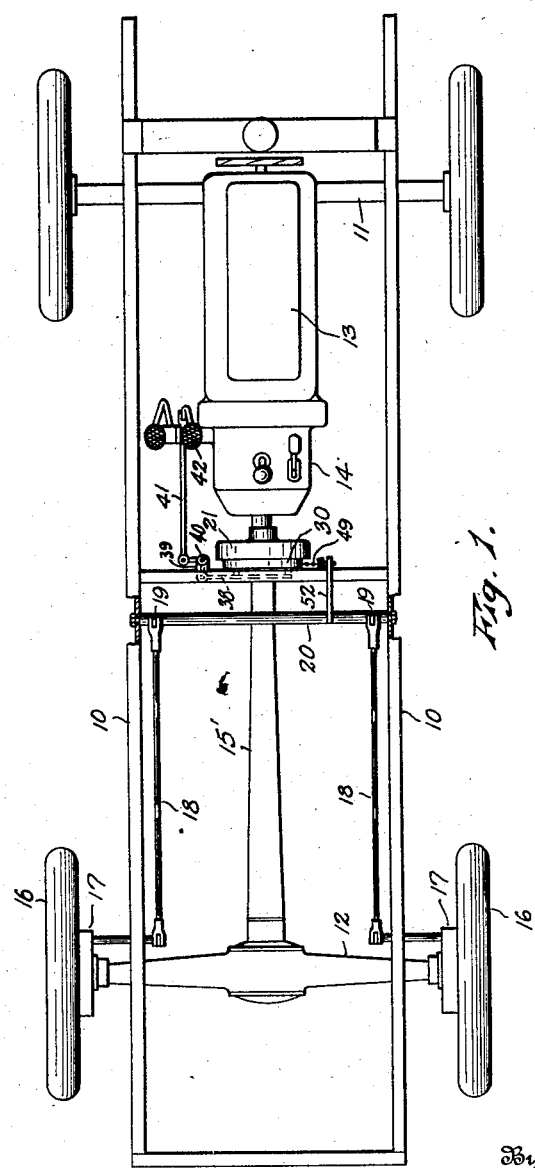
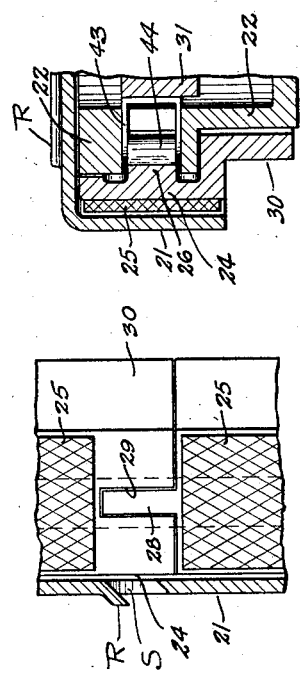
Inventor
Wilber J. Alberty
By Wooster & Davis
Attorneys.

Sept. 2, 1930.  W. J. ALBERTY  1,774,583
MECHANISM FOR APPLYING BRAKES
Filed Dec. 20, 1926   2 Sheets-Sheet 2

Inventor
Wilber J. Alberty
By Wooster & Davis
Attorneys

Patented Sept. 2, 1930

1,774,583

UNITED STATES PATENT OFFICE

WILBER J. ALBERTY, OF BRIDGEPORT, CONNECTICUT

MECHANISM FOR APPLYING BRAKES

Application filed December 20, 1926. Serial No. 155,891.

This invention relates to braking mechanism for motor vehicles, and especially to braking mechanisms for heavy vehicles, such as trucks, busses, or the like, and has for an object to provide a simple and improved brake operating mechanism which will utilize the momentum of the moving vehicle as the force for applying the brakes, thus making it easier for the operator to stop these heavy cars and also giving a quicker stop, especially when the car is heavily loaded, than can be secured with the ordinary foot or hand brake.

With the foregoing and other objects in view, I have devised the construction illustrated in the accompanying drawing forming a part of this specification. In this drawing, Fig. 1 is a top plan view showing an automobile chassis, engine and driving means in outline, and also indicating in outline my improved brake operating mechanism applied thereto.

Figure 2:
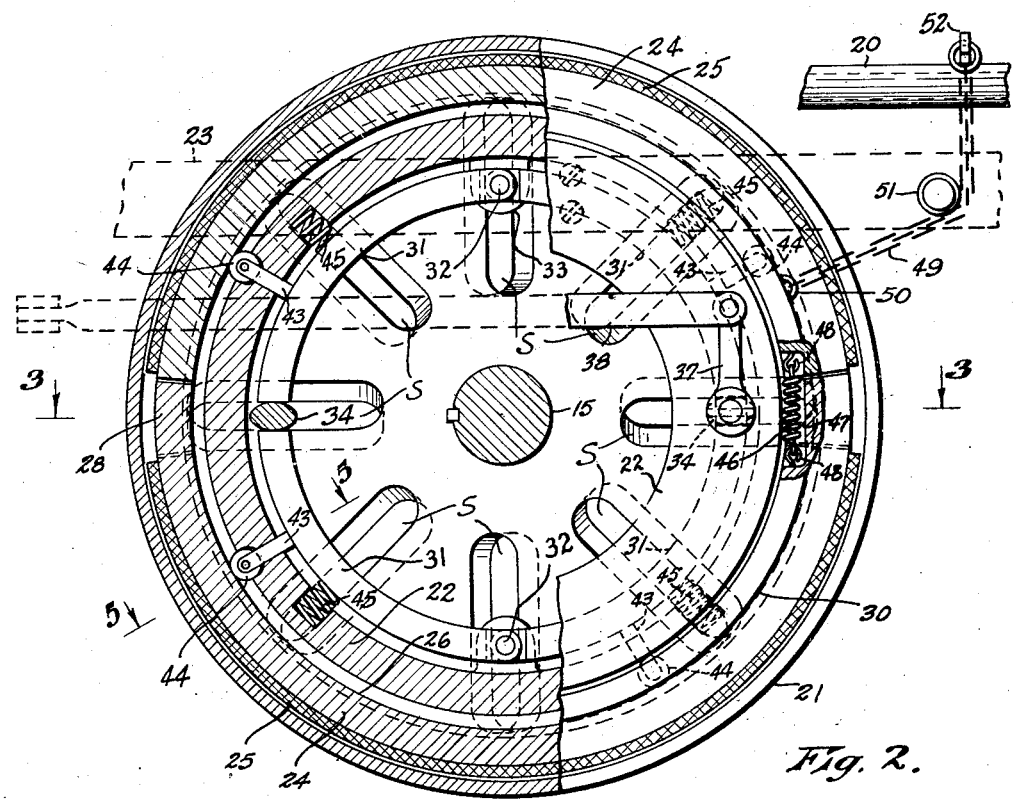
Fig. 2 is a transverse section through the brake operating mechanism substantially on line 2—2 of Fig. 3.
Figure 3:
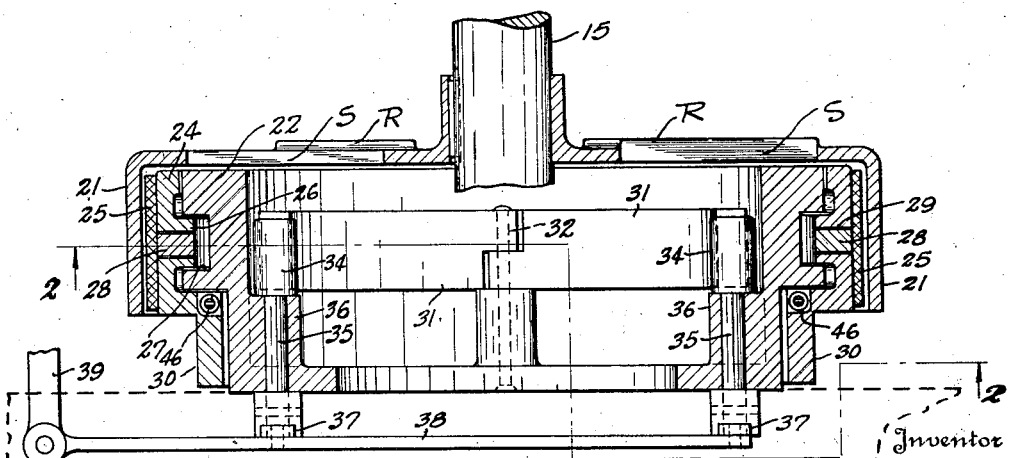
Fig. 3 is a section through the operating mechanism substantially on line 3—3 of Fig. 2.

Fig. 4 is a detail partial side elevation and partial section showing the joint between two sections of the inner drum, and Fig. 5 is a detail section substantially on line 5—5 of Fig. 2.

In operating heavy vehicles, especially heavily loaded trucks or busses, it is difficult for the operator to apply sufficient force to the ordinary brake mechanism to stop these vehicles, particularly where a quick stop is desired, and furthermore, as they require the application of considerable strength they are very tiring on the operator. I have devised a mechanism which employs the force of the moving vehicle as the force for applying the brakes, the operator being merely required to use sufficient strength to cause this device to function. This not only greatly relieves the operator but makes it possible to secure almost any force desired for applying the brakes, thus making it possible to stop the vehicle easily and quickly even though heavily loaded.

Referring to Fig. 1 the sides of the chassis frame of a motor vehicle are indicated at 10 mounted in the usual manner on the front and rear axles 11 and 12 respectively, and 13 represents the engine connected through the usual transmission device 14 to the drive shaft 15 in the housing 15', which leads to the rear drive and rear axle for driving the rear wheels 16 in the usual manner, the brakes being shown conventionally at 17. I have shown but a single pair of brakes for the rear wheels, but the device is, of course, equally adapted for use with other types of brakes. The brakes may be operated by the usual brake mechanism including the tie rods 18 connected to levers 19 on a transverse pivoted bar 20.

My improved brake operating mechanism is mounted immediately to the rear of the transmission 14 and comprises a drum 21 secured to the drive shaft 15 so as to rotate therewith, this drum is preferably provided in its forward side with slots (S) having inclined walls to act as a fan to pass air through to keep the parts cool and the drum is open to the rear side as shown. Inclined ribs (R) may be provided at the rear side of the slots to catch more air and thus increase the amount passed through. Within the drum is a stationary member 22 secured to some permanent part of the chassis, such as the cross beam 23. Between this stationary member and the rotating drum 21 is a second drum 24 made of a plurality of sections acting in effect as brake shoes, in the present instance there being two sections, and they each carry a strip 25 of the usual brake lining. This sectional drum has a rib 26 projecting into a corresponding annular groove 27 in the stationary member 22 which thus cooperate to retain this sectional drum in proper position and prevent its longitudinal or lateral movement on the member 22. The adjoining ends of the two sections of the drum 24 have a tongue and slot connection, that is, the end of one member is provided with a slot or notch 28 and the other has a tongue 29 extending into this notch for a purpose which will later be described. The drum 24 also projects from the open side of the rotating drum 21 to form a substantially circular winding drum portion 30.

Mounted within the stationary member 22 are a plurality of segments 31. In the present instance there are four of these segments arranged in two pairs, the pairs being pivoted to the stationary member 22 at the diametrically opposite points 32 through pivot pins in the bosses 33 on the stationary member. Between the adjacent free ends of these segments is a pivotally mounted oval cam 34, there being in the present instance two of these cams on diametrically opposite sides, each cam engaging the free ends of the two segments. These cams are mounted on rotary shafts 35 having a bearing in the bosses 36 in the stationary member 22 and projecting from the surface thereof where they are connected to crank arms 37. These crank arms are connected for operation by a link 38 to the arm of a bell crank lever 39 pivoted to the frame at 40, and whose other arm is connected by a suitable connection 41 to the usual foot operated brake lever 42.

Loosely carried in radial openings in the stationary member 22 are members 43 carrying rollers 44 which rest against the rib 26 carried by the sections of the inner drum 24. Coiled springs 45 are seated in sockets in the stationary member 22 and engage the outer surfaces of the pivoted segments 31 and tend to force them inwardly. The free ends of the sections of the drum 24 are connected by springs 46 mounted in recesses 47 in the sections of this drum. These springs are tension springs which are connected at their opposite ends to the sections of the drum, as indicated at 48, and tend to draw the sections together.

The drum portion 30 of the sectional drum 24 is connected to any suitable flexible connection, such as a chain 49, the connection being shown at 50, and this chain passes over a suitable guide roller 51 and is then connected to a lever 52 on the pivoted shaft or bar 20.

The operation is as follows: It will be apparent that as long as the vehicle is moving the shaft 15 will be rotating and with it the drum 21. Normally the springs 45 have forced the pivoted segments 31 inwardly and retain their free ends against the cams 34. The sections of the drum 24 are also drawn inwardly by the springs 46, removing the brake linings 25 from engagement with the inner surface of the rotating drum 21. Should now the operator wish to apply the brakes he merely presses on the brake pedal 42 which, acting through connections 41, bell crank 39, link 38 and crank arms 37, will turn the cams 34 on their pivots. The action of these cams on the free ends of the segments 31 will force these segments outwardly about their pivots 32 against the action of the springs 45, and this movement will force outwardly the members 43 and the rollers 44 carried thereby. As these rollers engage the surface of the rib 26 carried by the sectional drum 24 they will force these sections outwardly and force the lining 25 against the inner surface of the rotating drum 21. It will be obvious that when the frictional engagement between the drum 22 and the lining will tend to rotate the sectional drum 24 causing this drum to pull on the flexible connection or chain 49 and pull downwardly on the lever 52. This action will turn the bar 20 and through the tie rods 18 will apply the brakes. It will be obvious that the action is the same regardless in which direction the drum 21 is rotating, so that the brake operates in the same manner when the car is moving backwardly as when moving forwardly. As the drum 24 is given its turning movement the chain 49 will wind on the drum portion 30 but, of course, the winding operation is very small as probably under normal operation the movement of the drum 24 will not be more than two inches. Should, however, the connections be such as to allow a greater movement no harm would be done as the construction automatically takes care of any variation in this respect. Should the drum 24 move sufficiently to cause any one of the rollers 44 to pass over the joint between the free ends of the sections of the drum 24, this will be permitted by the tongue and notch connection 28—29 shown more clearly in Fig. 4. As soon as the operator releases the pressure on the brake pedal the springs 45 will force the segments 31 inwardly permitting the springs 46 to remove the brake lining carried by the sections of the drum 24 from engagement with the rotating drum 21, thus releasing the brake operating mechanism and causing the brakes to release.

It will be apparent from the foregoing description that the device is very simple in construction and is thus not liable to be easily gotten out of order, and furthermore, may thus be made up of a strong, rigid construction which will be reliable in operation. It will also be apparent that as the operator is required merely to exert sufficient force to apply the single frictional device 24—21, the device is very easily operated, but that the force available for applying the brakes to the car to arrest its movement is very great being the entire force of the momentum of the car with its load. Therefore, with a relatively small effort on the part of the operator practically any desired braking effect can be secured and movement of the car even with a heavy load, can be arrested easily and quickly.

Having thus set forth the nature of my invention, what I claim is:

1. In a motor vehicle having a rotating shaft, a drum connected to said shaft, a second drum within the first drum and including frictional members movable radially to and from engagement with the first drum, brake mechanism for the vehicle, an operative connection from the second drum to the brake mechanism, and personally controlled means for controlling the engagement of the frictional members with said rotating drum.

2. In a brake operating mechanism for motor vehicles having a rotating shaft and brake mechanism, a drum connected to said shaft, a stationary member within the drum, a plurality of friction shoes mounted on said member for radial and circumferential movements, an operative connection between the shoes and the brake mechanism, means carried by said stationary member for moving the shoes to and from engagement with the drum, and personally controlled means for operating said means.

3. In a brake operating mechanism for motor vehicles having a rotating shaft and brake mechanism, a drum connected to said shaft, a stationary member within the drum, a friction shoe mounted on said member for both radial and circumferential movements, an operative connection from the shoe to the brake mechanism, and personally controlled means for moving the shoe to and from engagement with the drum.

4. In a brake operating mechanism for motor vehicles having a rotating shaft and brake mechanism, a drum connected to said shaft, a stationary member associated with said drum, a friction shoe mounted on said stationary member for movement to and from the drum and circumferential movement, an operative connection from the shoe to the brake mechanism, and personally controlled means for moving the shoe to and from engagement with the drum.

5. In a brake operating mechanism for motor vehicles having a rotating shaft and brake mechanism, a drum connected to said shaft, a stationary member associated with the drum, a friction shoe, cooperating guide means on the shoe and member to guide the shoe for circumferential movement while permitting movement thereof toward and from the drum, an operative connection from the shoe to the brake mechanism operated by said circumferential movement, and personally controlled means for imparting movements toward and from the drum.

6. In a brake operating mechanism for motor vehicles having a rotating shaft and brake mechanism, a drum connected to said shaft, a stationary member within the drum, friction shoes between the drum and said member, cooperating guide means on the member and shoes to guide the shoes for circumferential movement while permitting radial movements to and from engagement with the drum, an operative connection between the shoes and the brake mechanism, and personally controlled means within the stationary member for imparting radial movement to said shoes.

7. In a brake operating mechanism for motor vehicles having a rotating shaft and brake mechanism, a drum connected to said shaft, a stationary member within the drum, friction shoes mounted between said member and the drum for circumferential movements and also movement toward and from the drum, an operative connection from the shoes to the brake mechanism, radially movable means engaging the shoes to force them toward the drum, movable members within the drum for operating said means, and personally controlled means for operating the movable members.

8. In a brake operating mechanism for motor vehicles having a rotating shaft and brake mechanism, a drum connected to said shaft, a stationary member within the drum, friction shoes mounted between said member and the drum for circumferential movements and also movement toward and from the drum, an operative connection from the shoes to the brake mechanism, members mounted in the stationary member for radial movement, rollers carried by said members engaging the shoes, pivoted members mounted to engage said members to force them outwardly against the shoes, cams for operating the pivoted members, and personally controlled means for operating the cams.

9. In a brake operating mechanism for motor vehicles having a rotating shaft and brake mechanism, a drum connected to said shaft, a stationary member within the drum provided with a circumferential groove, a friction shoe between the drum and said member having a rib in said groove to guide the shoe for circumferential movement while permitting radial movement of the shoe, an operative connection between the shoe and the brake mechanism, and personally controlled means for moving the shoe to and from engagement with the drum.

10. In a brake operating mechanism for motor vehicles having a rotating shaft and brake mechanism, a drum connected to said shaft, a stationary member within the drum provided with a circumferential groove, friction shoes between the drum and said member having ribs extending into said groove to guide them for circumferential movement while permitting radial movement, movable members mounted in the stationary member, rollers carried by the movable members engaging said ribs, pivoted segments within the stationary member and engaging said movable members, cams for operating the segments to shift said members, and means for operating the cams.

11. In a brake operating mechanism for motor vehicles having a rotating shaft and brake mechanism, a drum connected to said shaft, a stationary member within the drum, friction shoes between the drum and said member and mounted for circumferential and radial movements, said shoes having winding drum portions extending to one side of said drum, a flexible operative connection between said winding drum portion and the brake mechanism, means within the drum for shifting the shoes, and means for operating the shoe shifting means.

12. In a brake operating mechanism for motor vehicles having a rotating shaft and brake mechanism, a drum connected to said shaft, a stationary member within the drum having a circumferential groove, friction shoes between the drum and said member and having ribs extending into said groove to guide the shoes for circumferential movement while permitting radial movements, said shoes having a winding drum portion extending to one side of the rotary drum, a flexible connection from the winding drum portion to the brake mechanism, movable members carried by the stationary member, rollers carried by the movable members engaging said ribs on the shoes, pivoted segments within the stationary member to shift said movable members, cam means for shifting the segments to move the shoes to engagement with the rotary drum, means for operating the cams, and springs to remove the shoes from the drum when the segments are retracted.

In testimony whereof I affix my signature.

WILBER J. ALBERTY.